United States Patent [19]
Falb et al.

[11] Patent Number: 5,953,108
[45] Date of Patent: Sep. 14, 1999

[54] LASER BEAM PROJECTOR POWER AND COMMUNICATION SYSTEM

[75] Inventors: David M. Falb; Brian G. Zomberg, both of Grand Rapids; Bruce A. Boersma, Middleville, all of Mich.

[73] Assignee: Laser Alignment, Inc., Grand Rapids, Mich.

[21] Appl. No.: 08/961,463

[22] Filed: Oct. 31, 1997

Related U.S. Application Data

[60] Provisional application No. 60/047,844, May 28, 1997.

[51] Int. Cl.⁶ .............................. G01C 3/08; H01S 3/00
[52] U.S. Cl. .......................................... 356/4.08; 372/33
[58] Field of Search ............................. 372/33; 356/4.08

[56] References Cited

U.S. PATENT DOCUMENTS

| | | |
|---|---|---|
| 3,588,249 | 6/1971 | Studebaker . |
| 3,612,700 | 10/1971 | Nelson . |
| 3,729,266 | 4/1973 | Mason et al. . |
| 3,876,309 | 4/1975 | Zicaro et al. . |
| 4,062,634 | 12/1977 | Rando et al. ............................ 356/248 |
| 4,732,471 | 3/1988 | Cain et al. .............................. 356/4.08 |
| 4,756,617 | 7/1988 | Cain et a l. .............................. 356/4.08 |
| 5,533,268 | 7/1996 | Keightley . |

FOREIGN PATENT DOCUMENTS

| | | |
|---|---|---|
| 0452974 | 10/1991 | European Pat. Off. . |
| 1229906 | 9/1989 | Japan . |

OTHER PUBLICATIONS

Partial European Search Report from corresponding European Application No. EP 98 65 0030.

*Primary Examiner*—Stephen C. Buczinski
*Attorney, Agent, or Firm*—Van Dyke, Gardner, Linn & Burkhart, LLP

[57] ABSTRACT

A rotating laser beam projector includes a power controller having a micro controller coupled to a laser power circuit which determines whether the laser beam emitted by the projector is rotating or stationary. When the laser beam is rotating, the laser power circuit delivers a first level of continuance power to the laser. When the laser beam is stationary, the laser power circuit delivers a second level of continuance power to the laser which is less than the first level of power. The micro controller communicates messages from the laser beam projector to a remotely positioned sensor assembly by rotating the laser beam at a first speed when no message is to be communicated and rotating the laser beam at a second speed, different from the first speed, when a message is to be communicated. The laser beam projector includes a bridge for delivering electrical power to a pendulum-supported device from a stationary source. A first conductor is affixed to the stationary source and a second conductor is electrically coupled to the pendulum-supporting device. At least one wire is bonded, such as by ball-and-stitch bonding, from the conductor to the second conductor across a gap.

23 Claims, 12 Drawing Sheets

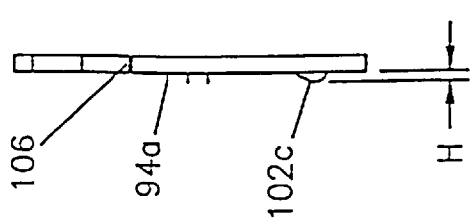
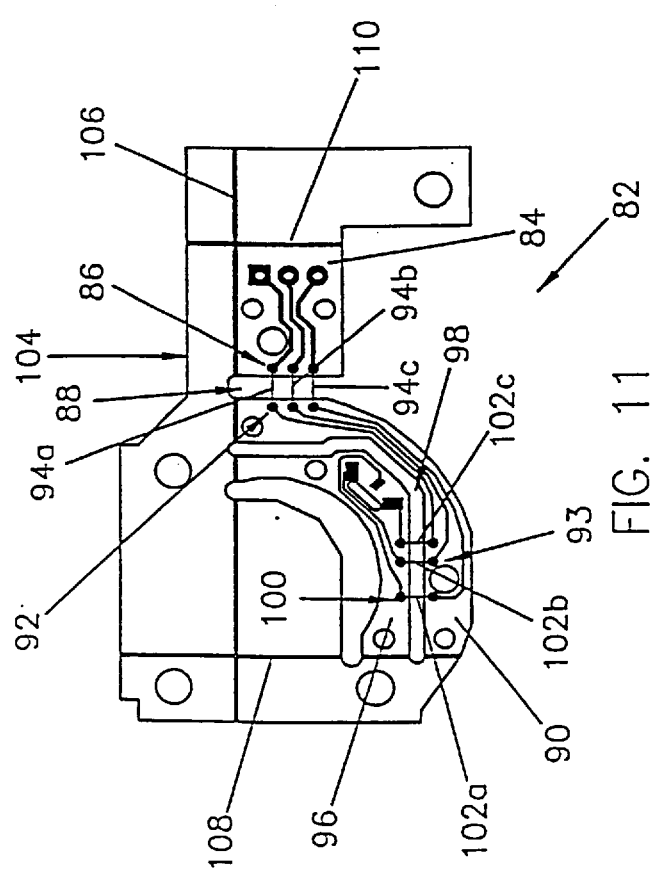
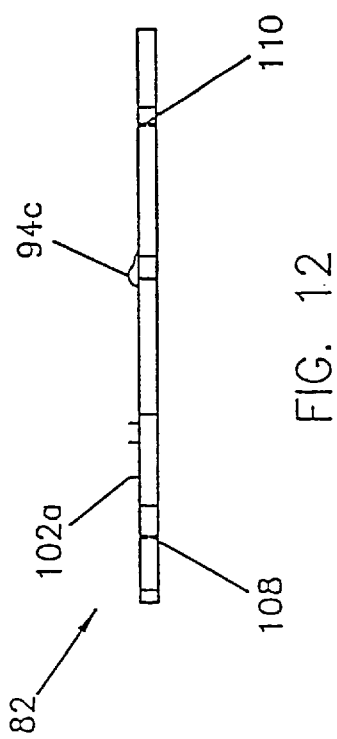

5,953,108

LASER BEAM PROJECTOR POWER AND COMMUNICATION SYSTEM

CROSS REFERENCE TO RELATED APPLICATIONS

This invention claims priority to U.S. Provisional Patent Application Ser. No. 60/047,844, filed May 28, 1997.

BACKGROUND OF THE INVENTION

This invention relates generally to laser beam projectors, and more particularly to a method and device for controlling and delivering power to a laser and communicating information from said laser to a remotely positioned sensor assembly. The invention has particular application for making measurements as well as machine control, such as with earth moving and construction equipment.

A common use of laser beam projectors in the construction industry is for ensuring that a trench or surface is of the proper and constant depth. The laser beam projector is placed at a fixed, known height, and an array of sensors senses the impingement of the laser beam. Depending on which sensors are impinged, the height of the receiver equipment relative to the laser beam projector can be determined.

While laser beam projectors come in a variety of different forms, this invention relates primarily to laser beam projectors which are capable of rotating. When the projector is in a rotation mode, the sensors in the sensor assembly do not continuously detect the laser beam, but rather only detect the laser beam for a brief instant when the rotating laser beam sweeps past the sensors. Rotating the laser beam, instead of keeping it constantly pointed in one direction, enables the sensors to move laterally with respect to the projector without the need for realignment of the laser beam projector with respect to the sensors. Because the rotating laser beam only impinges the sensors for a brief instant, the power of the signal detected by the sensors is much less than if the beam were not rotating, but instead continuously pointed at the sensors. The reduction in power of the detected signals makes it more difficult for the sensors to detect the signal and to filter the signal out from other radiation sources detected by the sensors, such as ambient sunlight. The distance from the projector which the sensor can effectively operate is therefore reduced when the laser beam is rotated.

In certain applications, the distance between the laser beam projector and the sensor may be quite large, which may lead to additional difficulties besides the relative weakness of the signal detected by the sensor. One difficulty relates to the requirement of keeping the laser beam level. If the laser beam is not level, the sensor will yield a height measurement that has an error component which increases with increasing distance from the laser. The height error may not be acceptable for various applications. One mechanism for eliminating the condition of a non-level laser beam projector is to mount the laser on a gimbal which allows the laser to generally swing freely so that the laser beam assumes a true vertical orientation. Providing power to the gimbaled laser, however, often hinders its free movement. In the past, to overcome the hindrance of the power feed mechanism to the free movement of the laser has typically required complex and expensive designs of the power feed mechanism.

Large distances between the laser beam projector and the sensor assembly may also make it difficult for people working near the sensor to know the status of the laser beam projector. For example, if the projector is bumped or otherwise knocked from its level position, this fact may not be readily apparent to people in the vicinity of the sensor if the projector is far away. An off level projector leads to the problems discussed above. Other conditions of the projector may also be important to know for those working away from the projector.

In light of the foregoing, a need can be seen for a laser which overcomes the difficulties associated with a laser beam projector stationed a large distance from the sensor unit.

SUMMARY OF THE INVENTION

The present invention is intended to provide a rotating laser beam projector and related methods which overcome the difficulties in the prior art. According to one aspect of the present invention, a laser beam projector includes a power controller having a microcontroller coupled to a laser power circuit. The microcontroller determines whether the laser beam emitted by the projector is rotating or stationary and controls the laser power circuit. When the laser beam is rotating, the laser power circuit delivers a first level of continuous power to the laser. When the laser beam is stationary, the laser power circuit delivers a second level of continuous power to the laser which is less than the first level of power.

According to another aspect of the present invention, a laser beam projector includes a bridge for delivering electrical power to a pendulum-supported device from a stationary source. A first conductor is affixed to the stationary source and a second conductor is electrically coupled to the pendulum supported device. At least one wire is bonded, such as by ball-and-stitch bonding, from the first conductor to the second conductor across a gap defined therebetween. The pendulum supported device may be a laser.

Another aspect of the present invention includes a method of communicating messages from a laser beam projector to a remotely positioned sensor assembly. The method includes the steps of rotating the laser beam emitted by the projector at a first speed when no message is to be communicated and rotating the laser beam at a second speed different from the first speed when a message is to be communicated. The emitted laser beam is detected at a remote sensor assembly which measures the frequency of detection of the laser beam. The measured frequency of detection is interpreted as receipt of the message when the frequency of detection is substantially equal to the second rotation speed of the laser beam.

The present invention overcomes the difficulties associated with operating the laser beam projectors and the sensor assembly with a large distance separation. The laser beam projector power controller overcomes the problem of a reduction in the usable operating distance of the laser beam projector when it is rotating. The laser beam projector power controller accomplishes this without having to reclassify the laser to a different power rating. The classification of a laser which is rotating will be different from the classification of a stationary laser because the stationary laser's power will be more concentrated. By altering the power delivered to the laser based on its state of rotation or non-rotation, the laser beam projector power controller delivers the maximum power to the laser at all times without the laser being reclassified to a higher power rating. The additional safety precautions which must be taken for a higher classification of laser can therefore be avoided without any concomitant loss in the safety of the projector.

The ability to alter the speed of rotation of the laser beam projector further facilitates a large spacing between the projector and sensor by allowing the projector to communicate messages to the sensor. People working in the vicinity of the sensor can therefore be more effectively informed of important status conditions of the projector, such as an off-level or low battery condition.

The bridge alleviates the difficulty of providing power to the laser without interfering with the leveling of the laser. The problems associated with an off-level controller are thus overcome in a simple and efficient fashion. These and other benefits, results, and objects of the present invention will be apparent to one skilled in the art, in light of the following specification when read in conjunction with the accompanying drawings.

BRIEF DESCRIPTION OF THE DRAWINGS

FIG. 11 is a plan view of the flexible power feed in FIG. 10 prior to installation in a laser beam projector;

FIG. 12 is front, elevational view of the flexible power feed of FIG. 11;

FIG. 13 is a side, elevational view of the flexible power feed of FIG. 11; and

DETAILED DESCRIPTION OF THE PREFERRED EMBODIMENTS

Figure 1:
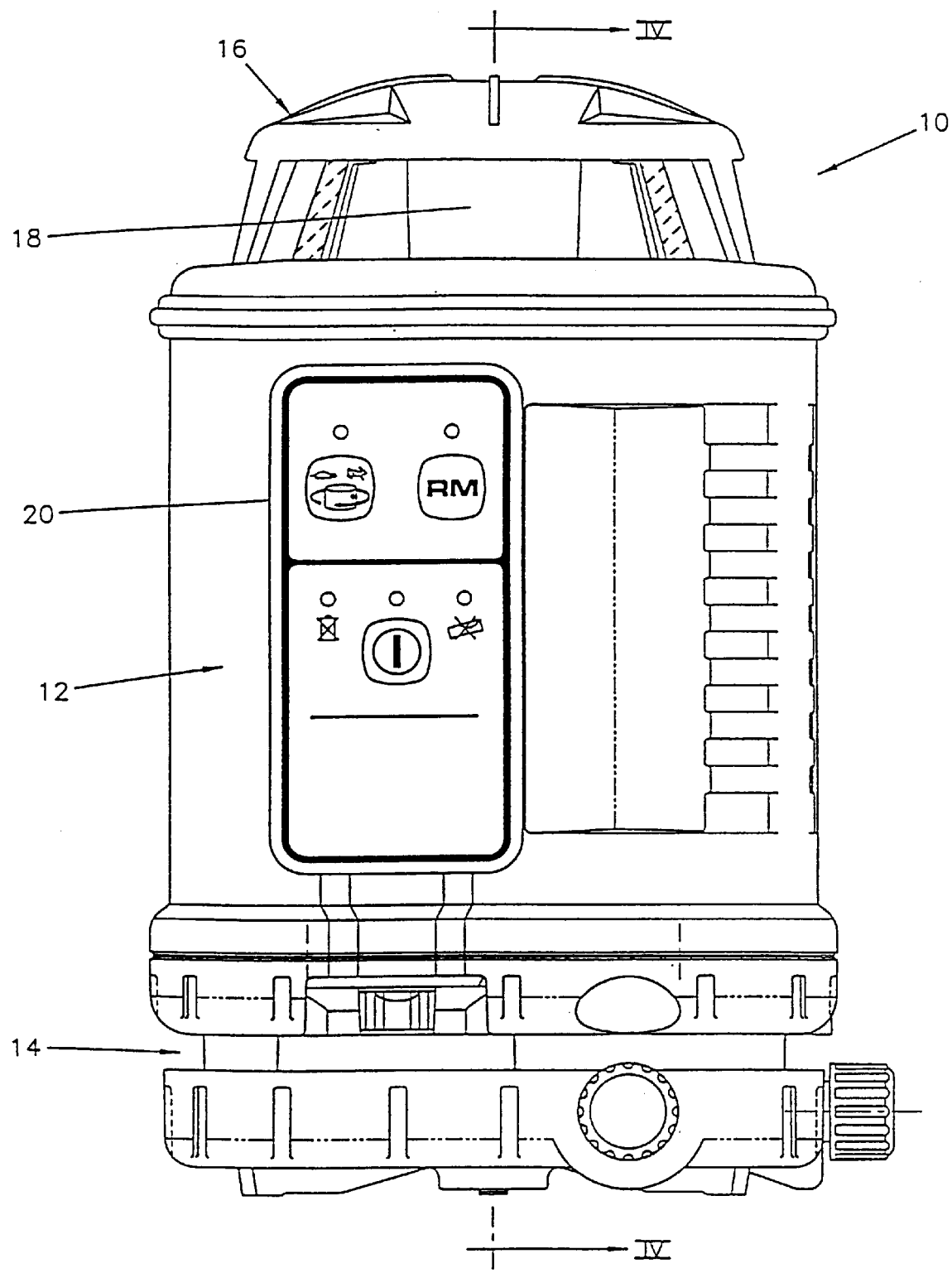
FIG. 1 is a side, elevational view of a laser beam projector according to the present invention.

The present invention will now be described with reference to the accompanying drawings wherein like reference numerals correspond to like elements in the several drawings. One example of a laser beam projector 10 embodying the present invention can be seen in FIG. 1. Laser beam projector 10 includes a body 12, an adjustable base 14 which supports body 12, and a top 16 which houses a rotating laser head 18. Adjustable base 14 allows projector 10 to be coarsely adjusted to a level position. Body 12 of projector 10 includes a control panel 20 which allows a user to make various control choices including allowing the user to choose between high speed rotation, low speed rotation, and no rotation for laser head 18. Rotating laser head 18 emits a laser beam (not shown) which is generally perpendicular to body 12. Alternatively, control panel 20 may allow the user to choose among more than two discrete rotation speeds or to vary the speed continuously within a range of speeds.

Figure 2:
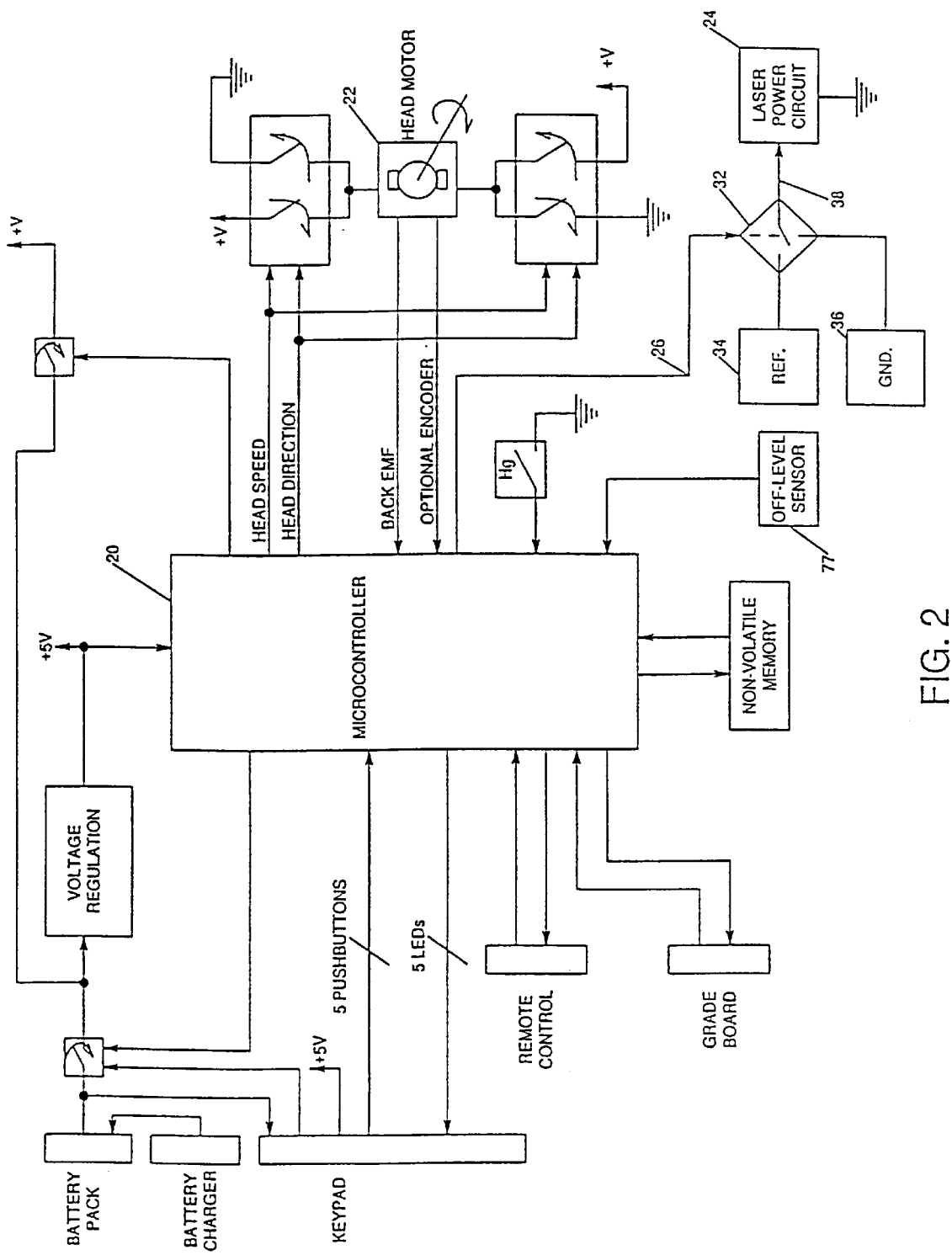
FIG. 2 is a block diagram of the electrical system of the laser beam projector of FIG. 1.

A block diagram of the electronics of projector 10 is illustrated in FIG. 2. Projector 10 includes a microcontroller 20 which controls the rotational speed of a head motor 22. Microcontroller 20 monitors the speed of a head motor 22 via back EMF created in the motor, although an encoder may also be included in head motor 22 to provide an additional or optional indication of the motor speed to microcontroller 20. Microcontroller 20 is electrically coupled to a laser power circuit 24 via switch 32. The combination of laser power circuit 24, switch 32, and microcontroller 20 forms a laser beam projector power controller 28 which controls the power supplied to a laser 30 (FIG. 3).

Figure 3:
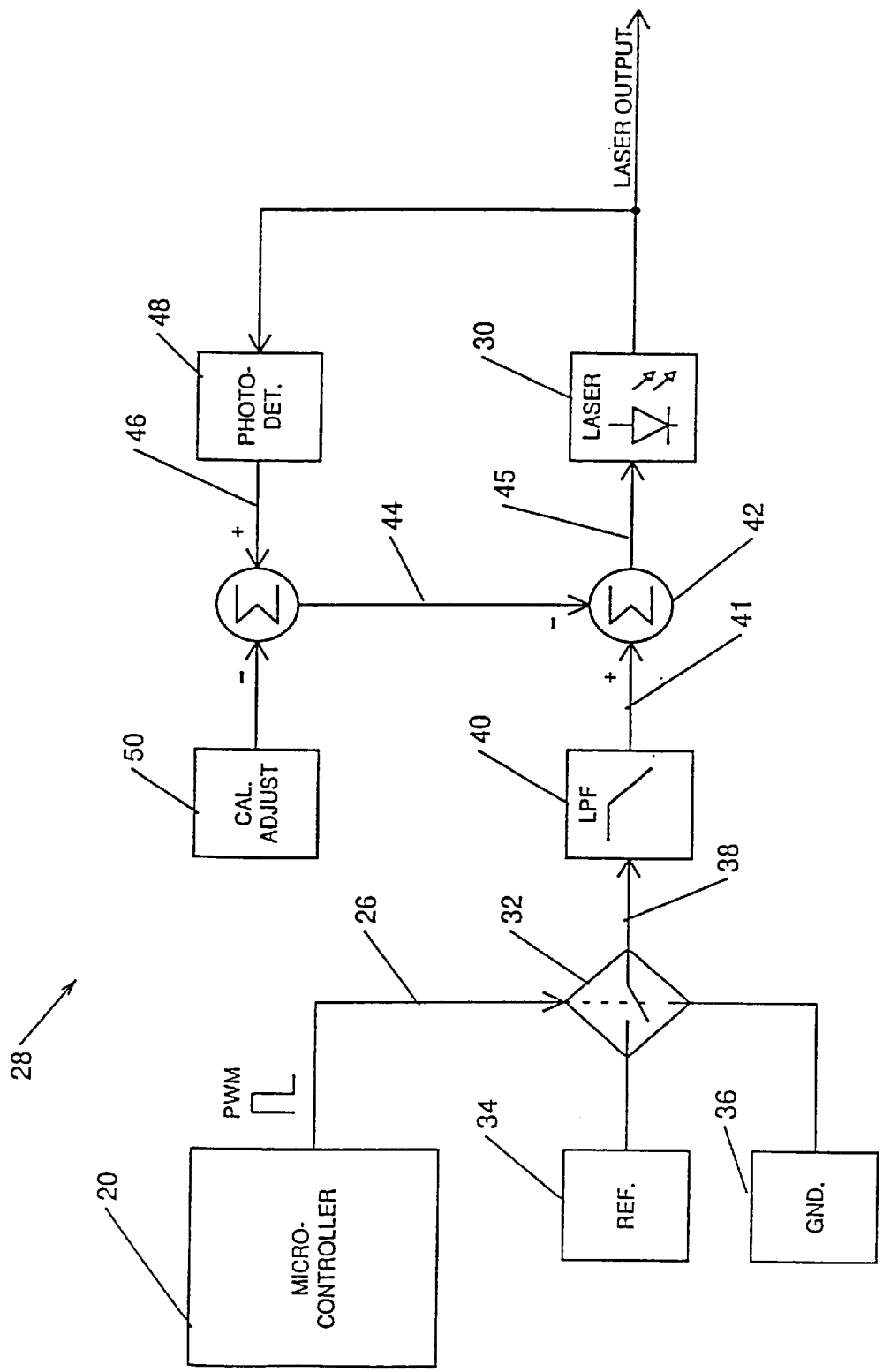
FIG. 3 is a more detailed block diagram of a portion of the block diagram in FIG. 2.

Switch 32 is controlled by a pulse width modulated control signal 26 produced by microcontroller 20 (FIGS. 2 and 3). Switch 32 is coupled to, and switches between, a reference voltage 34, and a ground potential 36. An output 38 of switch 32 is coupled to a low pass filter 40 which blocks high frequency signals. The output of low pass filter 40 is combined at a junction 42 with a calibrated feedback signal 44. An output 45 of junction 42 is delivered to laser 30 and delivers continuous wave power to illuminate laser 30. Calibrated feedback signal 44 is produced by combining an output 46 of a photo detector 48, which monitors the light output of laser 30 in a known manner, with a signal from a calibration adjuster 50.

The power delivered to laser 30 is controlled by control signal 26 generated by microcontroller 20. Control signal 26 is a pulse width modulated signal which alternates between low and high digital logic states and which controls switch 32. When control signal 26 is at a high voltage, switch 32 couples the input to low pass filter 40 to ground 36 and no signal is delivered to low pass filter 40. When control signal 26 is at a low voltage, switch 32 couples reference voltage 34 to the input of low pass filter 40. The duty cycle of control signal 26 determines the continuous power delivered to laser 30. When the duty cycle of control signal 26 is 0%, i.e. when the control signal is continuously at a low voltage, reference voltage 34 passes through low pass filter 40 to laser 30 and laser 30 operates at a maximum power. When the duty cycle of control signal 26 is greater than 0%, reference voltage 34 and ground 36 are alternately coupled to low pass filter 40 and the power delivered to laser 30 is less than maximum power. When the duty cycle of control signal 26 is 100%, control signal 26 is continuously at a high voltage and ground 36 is constantly coupled to low pass filter 40. Laser 30 thus receives no power. It should be emphasized that whatever the duty cycle of control signal 26, laser 30 emits continuous wave light that is not pulsed. The pulsed signal generated by control signal 26 is smoothed by the passage through low pass filter 40, and laser 30 emits continuous wave light.

Figure 4:
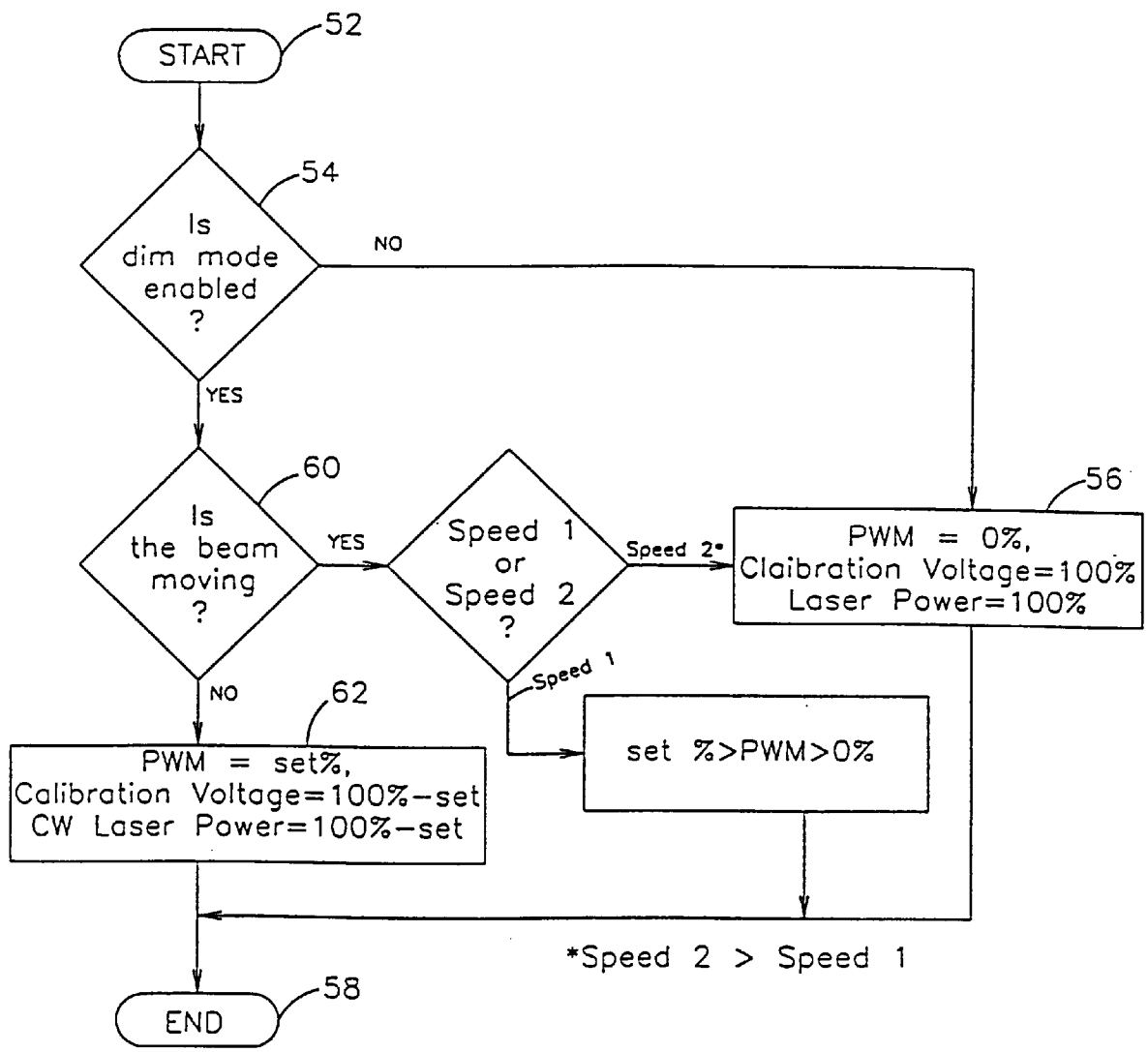
FIG. 4 is a flowchart of a control algorithm for a microcontroller.

FIG. 4 illustrates the control logic followed by microcontroller 20. The control sequence starts at block 52, and is followed by a determination at 54 of whether or not the dim mode has been enabled. The dim mode refers to the operational mode of projector 10 wherein the power delivered to laser 30 is decreased as the speed of rotation of laser head 18 is decreased. If the dim mode is not enabled, control passes to step 56 and full power is continuously delivered to laser 30. The control sequence then terminates at an end 58. If it is determined at 54 that the dim mode is enabled, then microcontroller 20 next determines at 60 if laser head 18 is rotating or stationary. If laser head 18 is rotating, control again passes to 56 and full power is delivered to laser 30. If it is determined at 60 that laser 30 is stationary, control passes to 62 and the power delivered to laser 30 is decreased in proportion to the duty cycle of control signal 26. The reduction in power at step 62 can be a single step reduction, a plurality of discrete reductions based on different rotational speeds of laser head 18, or can be a continuous reduction proportional to the rotational speed of laser head 18. In other words, control signal 26 can be altered between two discrete duty cycles, a plurality of discrete duty cycles, or an infinite and continuous range of duty cycles. In the preferred embodiment, the power delivered to laser 30 is adjusted in discrete levels corresponding to the one or more discrete rotational speeds of laser head 18.

Figure 5:
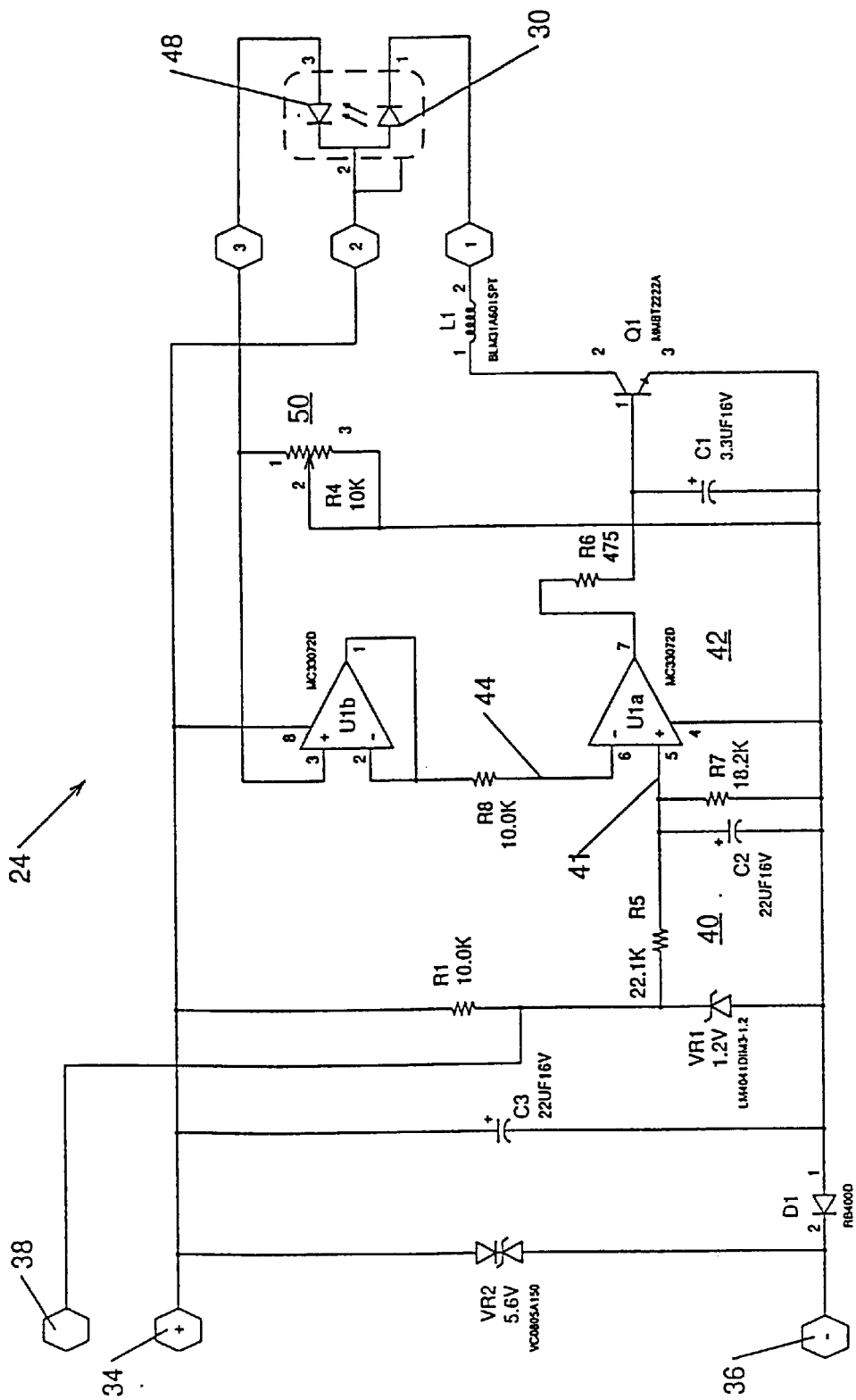
FIG. 5 is an electrical schematic of the laser beam projector power control circuit.

FIG. 5 illustrates a detailed schematic of laser beam projector power controller 28. Output signal 38 from switch 32 (FIG. 3) is fed into laser power control circuit 24 and is filtered by low pass filter 40 made up of a capacitor C2 and a resistor R7. The output of filter 40 is a reference voltage 41, which is supplied to the noninverting input of amplifier U1a. A calibrated feedback voltage 44 is established by current from monitoring diode 48 flowing through calibration potentiometer R4, then buffered by amplifier U1b. Feedback voltage 44 is fed into the inverting input of amplifier U1a. Amplifier U1a controls the current flowing through transistor Q1, hence the power applied to laser diode 30, by adjusting the voltage at the base of Q1 in such a manner as to cause feedback voltage 44 to be equal to reference voltage 41.

Figure 6:
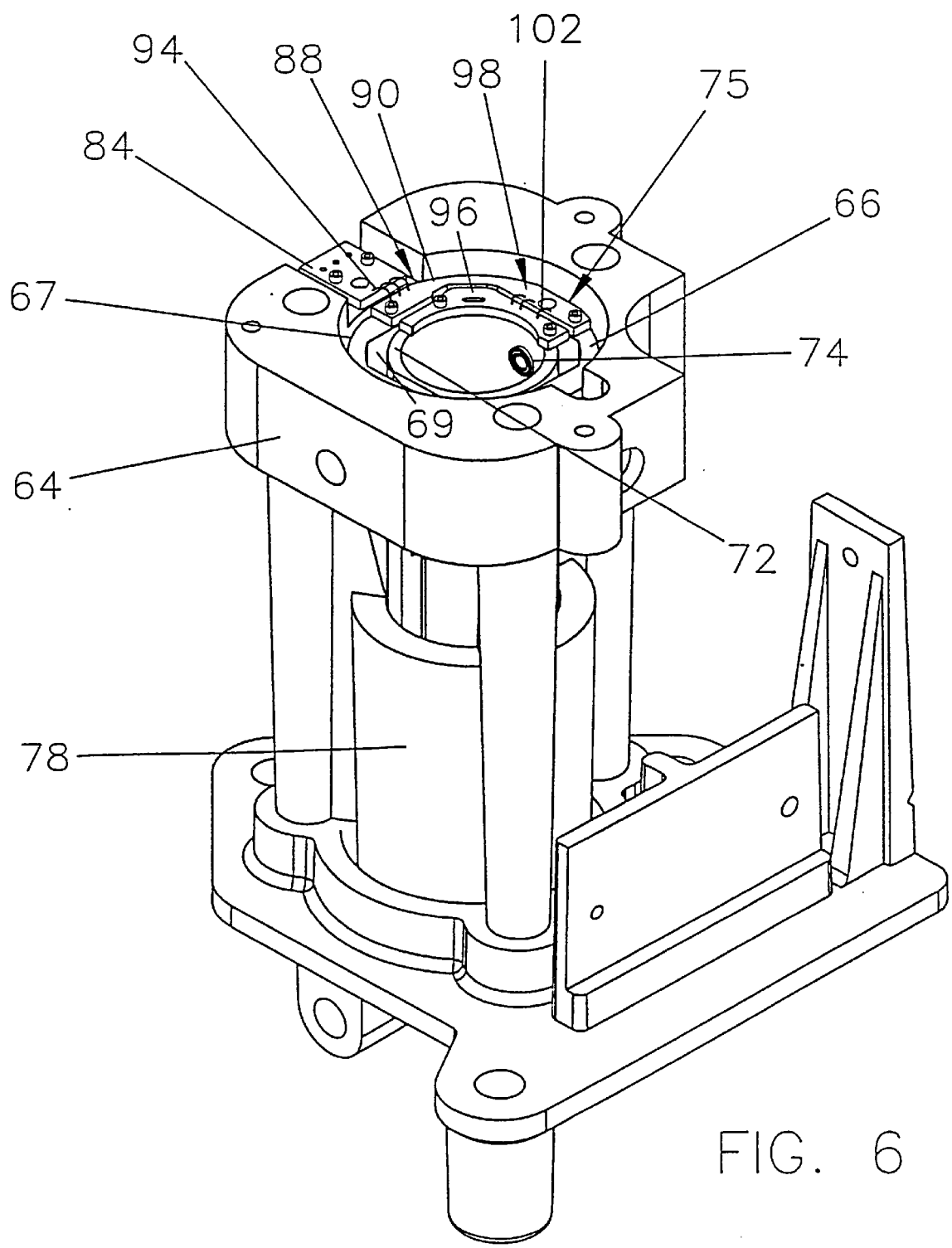
FIG. 6 is a perspective view of the internal structure of the laser beam projector in FIG. 1.
Figure 7:
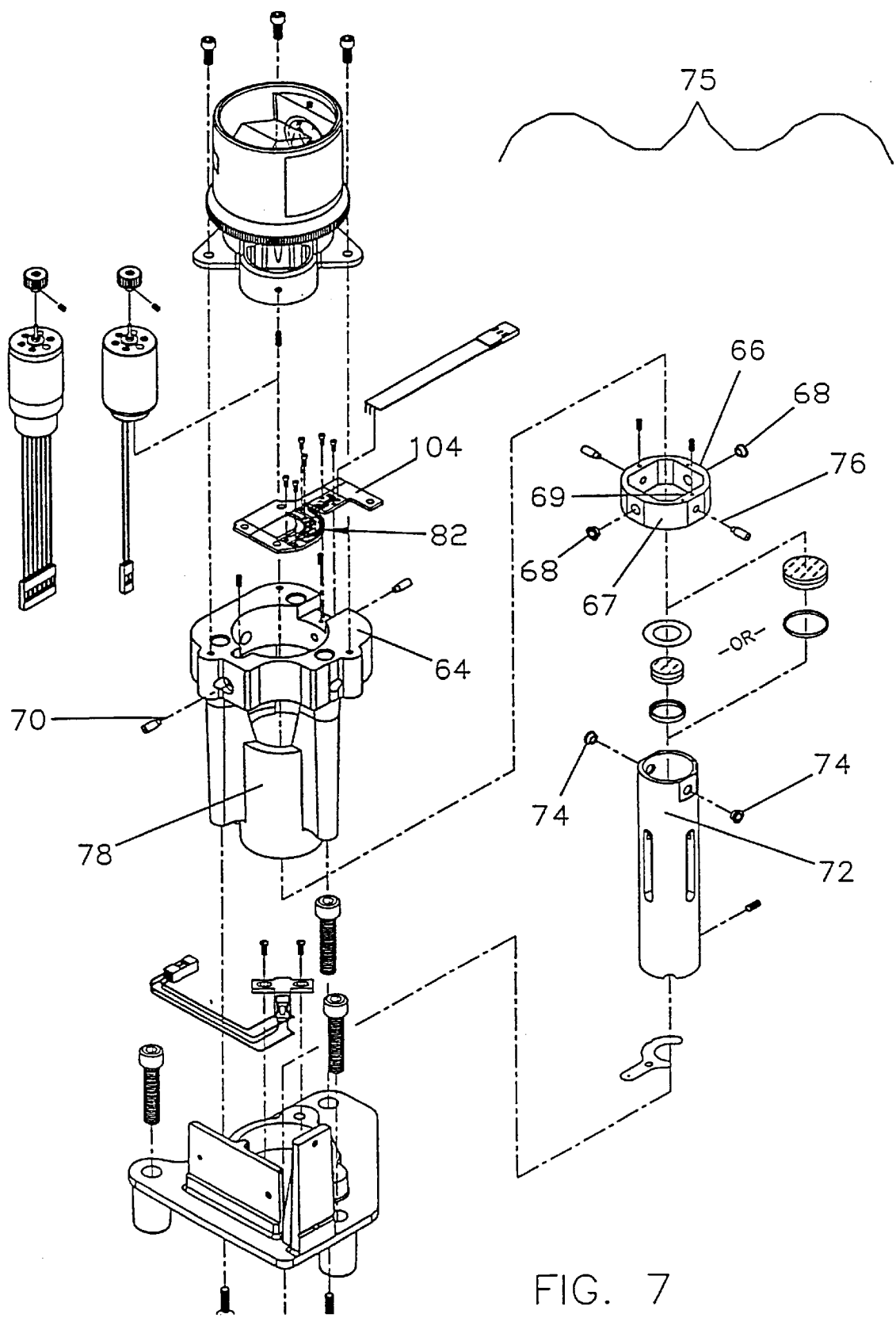
FIG. 7 is a partial, exploded perspective view the internal structure of FIG. 6.
Figure 8:
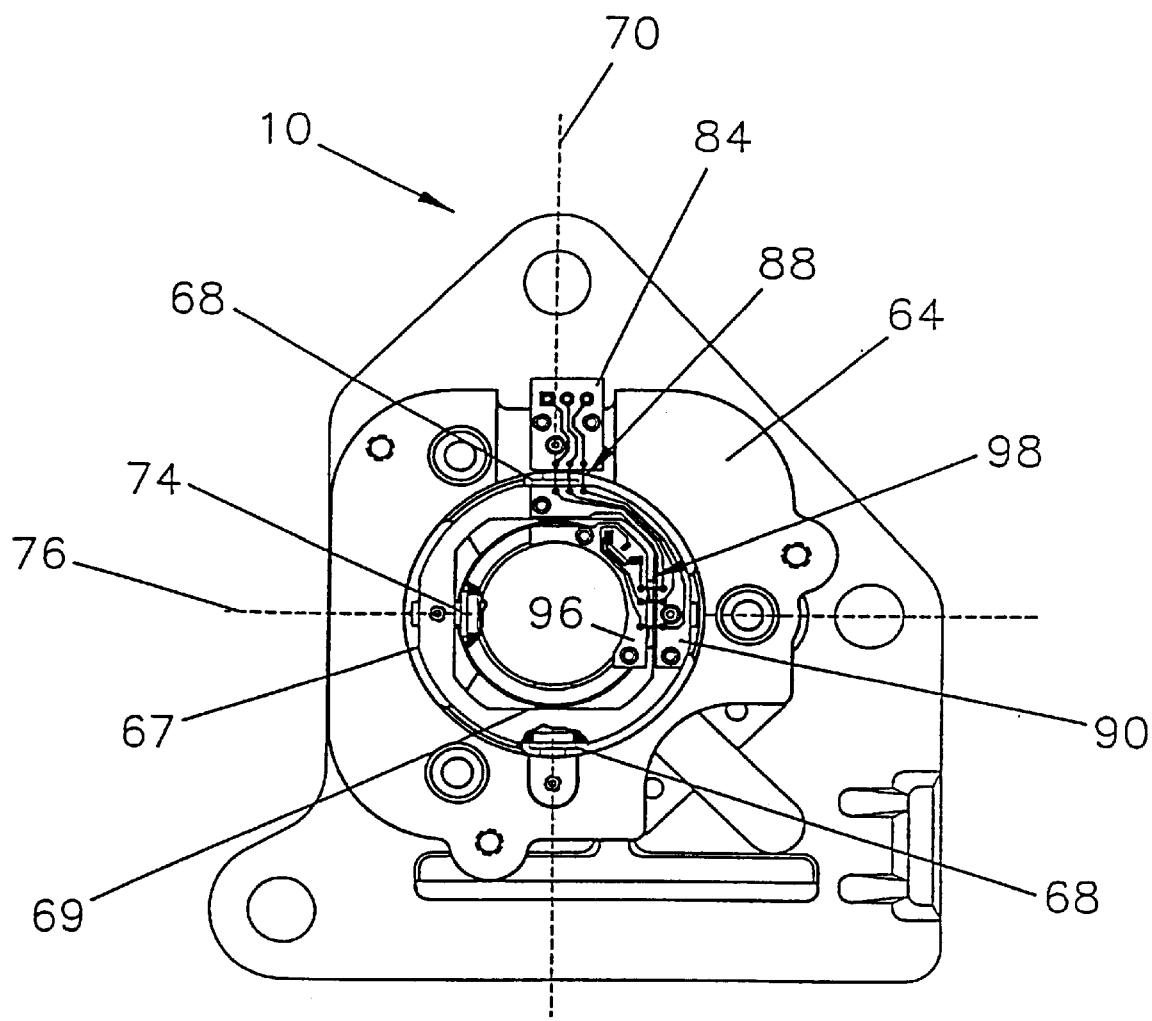
FIG. 8 is a top plan view of the internal structure of FIG. 6.

A perspective view of the internal structure of laser beam projector 10 is depicted in FIGS. 6 and 7. Laser beam projector 10 includes a stationary structure 64 which movably supports a pendulum assembly 75. Pendulum assembly 75 is mounted in a manner which allows pendulous motion within a defined cone. Pendulum assembly 75 includes a laser housing 72 and a gimbal ring 66. Gimbal ring 66 includes an exterior side 67 and an interior side 69 (FIGS. 6–8). Gimbal ring 66 is pivotally attached on exterior side 67 to stationary structure 64 via a first set of bearings 68 defined in stationary structure 64. Gimbal ring 66 is therefore free to rotate about a first rotational axis 70 defined by first set of bearings 68. Laser housing 72 is pivotally attached to interior side 69 of gimbal ring 66 via a second set of bearings 74 defined in gimbal ring 66. Second set of bearings 74 define a second rotational axis 76 which is perpendicular to first rotational axis 70. The arrangement of stationary structure 64, gimbal ring 66, and laser housing 72 allow laser housing 72 to move to a vertical orientation in a pendulum-like fashion when stationary structure 64 is tilted to a certain degree. If stationary structure 64 is tilted to a greater degree, the off-level sensor 77 (FIG. 2) will detect such condition and supply an input to microcontroller 20. Laser housing 72 swings within a cylindrical body portion 78 of stationary structure 64 which forms an air dampener to damper motion of the pendulum assembly. The gimbaled support of laser housing 72 thus provides a fine adjustment for leveling laser housing 72, while the coarse adjustment is provided by adjustable base 14.

Figure 9:
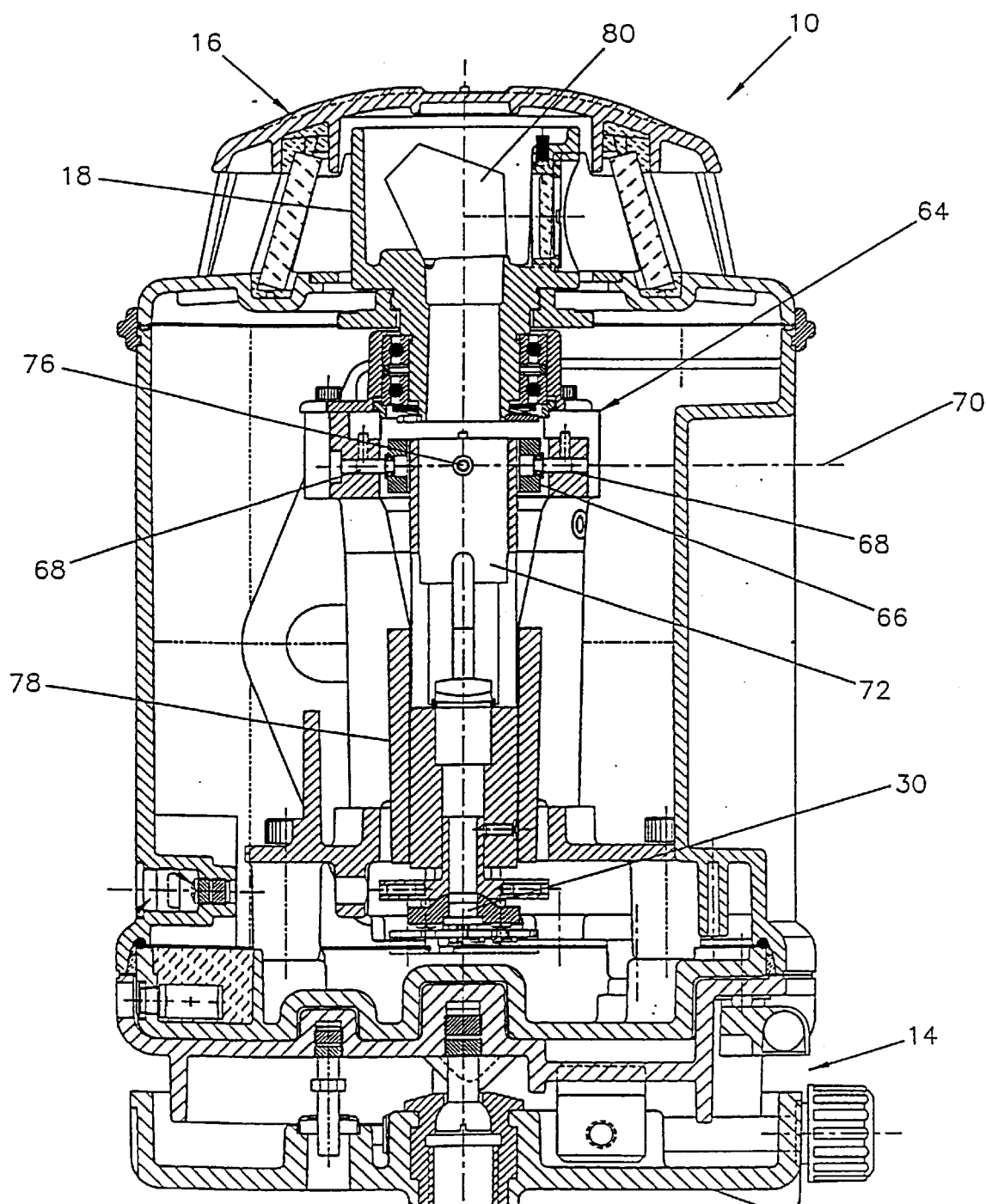
FIG. 9 is a section taken along the lines IX—IX in FIG. 1.

A vertical cross section of laser beam projector 10 is depicted in FIG. 9. Laser housing 72 supports and houses laser 30 which emits a laser beam vertically upwardly. The laser beam projects upward in contact with a rotating pentaprism 80. Rotating pentaprism 80 is rotated on stationary structure 64 by motor 22 and bends the laser beam 90°. Pentaprism 80 bends the laser beam 90° regardless of its orientation so that the vertical laser beam will be reflected and emitted from laser beam projector 10 precisely horizontally.

Laser 30 is powered by a battery (not shown), or other power source supported by stationary portion 64. An electrical connection in the form of a flexible power feed or bridge 82 delivers power to laser 30 from stationary source 64 through laser housing 72. In order for pendulum assembly 75 to accurately align vertically, bridge 82 must not substantially interfere with pendulous movement of laser housing 72. Bridge 82 (FIG. 10) provides a novel way of delivering electrical power and control signals to laser 30 without disrupting the leveling of laser 30.

Figure 10:
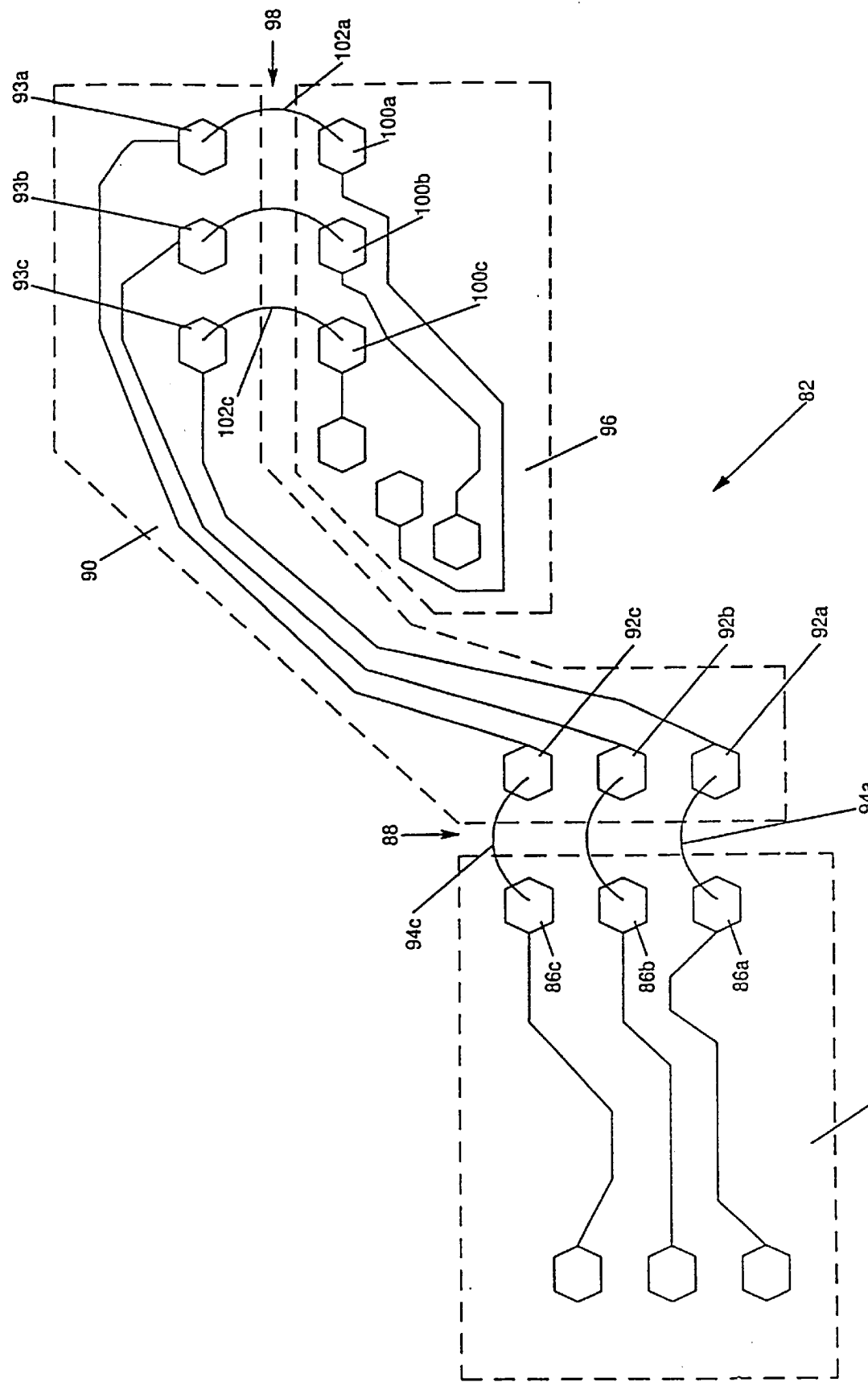
FIG. 10 is a diagram of a flexible power feed assembly.

Bridge 82 includes a first printed circuit board 84 affixed to stationary structure 64, a second printed circuit board 90 affixed to gimbal ring 66, and a third printed circuit board 96 affixed to laser housing 72 (FIGS. 6, 8, and 10). A first gap 88 is defined between first and second printed circuit boards 84 and 90, and a second gap 98 is defined between second and third printed circuit board 90 and 96. Printed circuit board 84 includes three electrical contacts 86a, b, c, (FIG. 10) adjacent first gap 88. Second printed circuit board 90 includes three electrical contacts 92a, b, c located adjacent gap 88 and across from contacts 86a, b, c. Second printed circuit board 90 further includes three electrical contacts 93a, b, c defined adjacent second gap 98 and across from three electrical contacts 100a, b, c on third printed circuit board 96. Contacts 86a, b, c and 92a, b, c are electrically coupled to each other by bonded wires 94a, b, c. Contacts 93a, b, c are coupled to contacts 100a, b, c by bonded wires 102a, b, c. Bonded wires 94a, b, c and 102a, b, c are implemented via a ball-and-stitch bonding process which is known and used in the semiconductor industry for connecting stationary electrical components. Bridge 82 of the present invention uses the ball-and-stitch bonding process in a novel application where the components being electrically coupled are moveable with respect to each other.

Prior to incorporation of bridge 82 into laser beam projector 10, printed circuit boards 84, 90, and 96 are all part of a single printed circuit board 104 (FIGS. 11–13). Printed circuit board 104 includes three breaklines 106, 108, and 110. When circuit board 104 is cut or broken along break lines 106, 108, and 110, the three separate circuit boards 84, 90, and 96 are formed.

In the preferred embodiment, bonded sets of wires 94 and 102 are made of either pure gold or aluminum, although other materials can be used within the scope of the invention. The height H of the loops formed by bonded wires 94 and 102 is preferably 0.035 inches, and the diameter of the wire bonds is preferably 0.001 inches, although other heights and diameters are acceptable (FIG. 13). The ball end of wires 94 and 102 is affixed to second circuit board 90, while the stitch ends are affixed to circuit boards 84 and 96. First set of wires 94 are located above and generally parallel to first rotational axis 70 (FIGS. 6 and 8). This location creates minimal flexing of wires 94 as second printed circuit board 90 moves. Second set of wires 102 are located above and generally parallel to second rotational axis 76. This location creates minimal flexing of wires 102 when second and third circuit boards 90 and 96 move with respect to each other. Bridge 82 allows a tilt of stationary structure 64 of at least 15 arc-seconds from the vertical while still retaining laser housing 72 in a vertical orientation. It will be understood that bridge 82 is not limited to use in rotating laser beam projectors, but can be used in laser beam projectors of the non-rotating variety as well such as a self aligning sewer pipe laser of the type disclosed in U.S. Pat. No. 5,621,531 or other sewer pipe laser, or the like.

Figure 14:
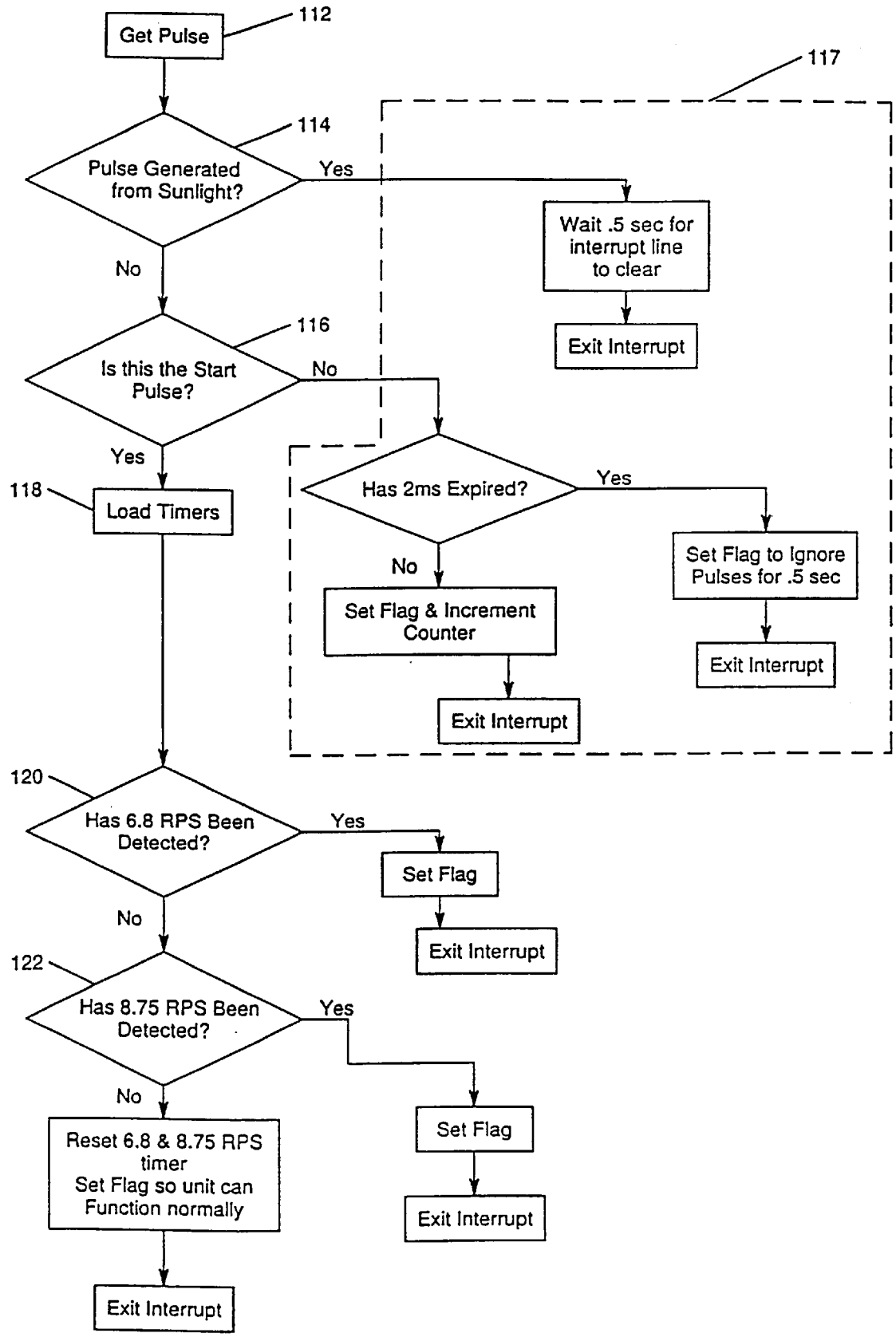
FIG. 14 is a logic flow diagram of a sensor assembly control system according to the present invention.

A method of communicating messages from laser beam projector 10 to a sensor assembly or sensing unit (not shown) is illustrated in block diagram form in FIG. 14. The method involves rotating the laser beam emitted by laser beam projector 10 at different speeds to indicate different messages to the sensor. The sequence of logic decisions performed by the sensor begins at a first step 112 of detecting a pulse of radiation. The pulse is analyzed at a decision point 114 to determine if the pulse is the result of sunlight or other non-laser radiation. The mechanics involved in performing this step are not part of the present invention and will not be repeated herein. At a decision point 116, the detected pulse is analyzed to determine if it is at a start pulse or not. If the pulse is at a start pulse, a timer is started at a step 118. If the pulse is not a start pulse, or if the pulse is determined to be a result of sunlight, a sequence of steps 117 is performed. A more detailed description of the sequence of steps 117 can be found in commonly assigned, co-pending application Ser. No. 619,926, filed Mar. 20, 1996, which is incorporated herein by reference. At decision points 120 and 122, the timer is utilized to determine if the stream of pulses is occurring at 6.8 or 8.75 revolutions per second (RPS). The sensor interprets the detection of 6.8 and 8.75 RPS as two different messages.

In the preferred embodiment, the messages indicate either a low battery level in the projector or non-level condition of the projector. It will be understood, of course, that any of a variety of different messages may be communicated, and that more than two different speeds may be utilized to communicate a plurality of messages. It will be further understood that any revolution speed can correspond to any message so long as the revolution speed is different from the normal operating speed or speeds of the projector, and the speeds are sufficiently different that the sensor can distinguish between them. In the illustrated embodiment, an error speed measurement of ±0.5 RPS is acceptable.

While the present invention has been described in terms of the preferred embodiments discussed in the above specification, it will be understood by one skilled in the art that the present invention is not limited to these particular preferred embodiments, but includes any and all such modifications that are within the spirit and scope of the present invention as defined in the appended claims.

The embodiments of the present invention in which an exclusive property or privilege is claimed are defined as follows:

1. A method of communicating a message from a laser beam projector which emits a laser beam to a remotely positioned sensor, comprising the steps of:
    rotating said laser beam at a first speed when no message is to be communicated from said laser beam projector to said sensor;
    rotating said laser beam at a second speed different from said first speed when a first message is to be communicated from said laser beam projector to said sensor;
    detecting at the sensor the laser beam emitted by said laser beam projector;
    measuring the frequency of detection by the sensor of said laser beam; and
    interpreting said frequency of detection as receipt of the first message when said frequency of detection is substantially equal to said second speed of rotation of said laser beam.

2. The method of claim 1 wherein said message relates to a condition of the laser beam projector.

3. The method of claim 2 wherein said message indicates a low battery in said laser beam projector.

4. The method of claim 2 wherein said message indicates said laser beam projector is not level.

5. The method of claim 1 further including the step of activating an indicator on said sensor when the message is received by said sensor.

6. The method of claim 5 wherein said indicator produces an audible sound.

7. The method of claim 1 further including the steps of:
    rotating said laser beam at a third speed different from said first and second speeds when a second message is to be communicated from said laser beam projector to said sensor; and
    interpreting said frequency of detection as receipt of said second message when said frequency of detection is substantially equal to said third speed of rotation of said laser beam.

8. The method of claim 7 wherein one of said first and second messages indicates said laser beam projector is not level and the other of said first and second messages indicates said laser beam projector has a low battery.

9. The method of claim 8 further including the step of activating an indicator in a first manner upon receipt of said first message and activating said indicator in a second manner different from said first manner upon receipt of said second message.

10. The method of claim 8 further including the step of activating a first indicator upon receipt of said first message and activating a second indicator different from said first indicator upon receipt of said second message.

11. A rotating laser beam projector system, comprising:
    a laser which emits a laser beam;
    a motor for rotating said laser beam;
    a power supply for said laser beam projector;
    a first sensor for detecting the absence or presence of a first condition of said laser beam projector; and
    a controller which rotates said laser beam at a first speed when said sensor detects the absence of said condition and which rotates said laser beam at a second speed different from said first speed when said sensor detects the presence of said condition.

12. The rotating laser beam projector system of claim 11 further comprising a second sensor for detecting the absence or presence of a second condition of said laser beam projector wherein said controller rotates said laser beam at a second speed only when said second sensor detects the presence of said second condition and said first sensor detects the absence of said first condition.

13. The rotating laser beam projector system of claim 12 wherein said first condition is one of a low battery level and an off level position of said laser beam projector, and said second condition is the other of said low battery level and said off level position of said laser beam projector.

14. The rotating laser beam projector system of claim 11 wherein said first condition is a discreet level of power in the diode in said laser.

15. The rotating laser beam projector in claim 11 further including a sensor unit for detecting said laser beam projector comprising:
    a laser radiation detector;
    a clock circuit which determines the frequency at which a laser from said rotating laser beam projector impinges said laser radiation detector; and
    a controller which produces a plurality of indications to a user of said sensor unit, each of said plurality of indications corresponding to different frequencies at which said clock circuit determines said laser to impinge said laser radiation detector.

16. The rotating laser beam projector of claim 15 wherein at least one of said plurality of indications indicates a low battery level in the rotating laser beam projector.

17. The rotating laser beam projector of claim 15 wherein at least one of said plurality of indications indicates that said rotating laser beam projector is not level.

18. The rotating laser beam projector of claim 15 wherein at least one of said plurality of indications indicates both a low battery level in the rotating laser beam projector and that the rotating laser beam projector is not level.

19. A laser beam projector, comprising:

a laser, which provides a beam of light, a system which rotates the beam provided by the laser and a beam projector power controller for controlling the power of the beam produced by the laser source;

wherein said power controller includes a microcontroller for determining whether the laser beam is rotating or stationary and a laser power circuit which is coupled to and controlled by the microcontroller and delivers a first continuous level of power to the laser when the laser is rotating and a second continuous level of power when the laser is stationary, said first level of power greater than said second level of power.

20. The laser beam projector power controller of claim 19 wherein said microcontroller is programmed to deliver a pulse width modulated signal to said laser power circuit when said laser is rotating, and said pulse width modulated signal has a duty cycle which determines said first continuous power level.

21. The laser beam projector power controller of claim 19 wherein said microcontroller is programmed to determine the speed of rotation of the laser beam, said microcontroller delivers a pulse width modulated signal which has a duty cycle to said laser, said duty cycle is inversely proportional to said speed of rotation of said laser beam, and said duty cycle is inversely proportional to the power delivered to said laser.

22. A method of controlling the power of a laser beam in a laser beam projector which can emit either a rotating laser beam or a stationary laser beam comprising:

determining whether the laser beam is rotating or stationary;

setting a continuous power of the laser beam at a first level if the laser beam is stationary, said first level of power being greater than zero; and setting a continuous power of the laser beam at a second level which is greater than said first level if the laser beam is rotating.

23. A method of controlling the power of a laser beam in a laser beam projector comprising:

determining whether the laser beam is rotating or stationary;

setting a continuous power of the laser beam at a first level if the laser beam is stationary;

setting a continuous power of the laser beam at a second or third level if the laser beam is rotating, both said second and third levels being greater than said first level;

determining whether the rate of rotation of the laser beam is at a first rate or second rate if the laser beam is rotating, said second rate being greater than said first rate;

setting a continuous power of the laser beam at said third level if the laser beam is rotating at said second rate of rotation, said third level of power being greater than said second level of power; and setting a continuous power of the laser beam at said second level if the laser beam is rotating at said first rate of rotation.

* * * * *